United States Patent [19]
Schmidt

[11] Patent Number: 6,092,699
[45] Date of Patent: Jul. 25, 2000

[54] GRAVITY FLOW MICROPROCESSOR CONTROLLED PORTABLE PLANT DISPENSING SYSTEM

[76] Inventor: Philip Arthur Schmidt, 7256 Gerard Dr., Eden Prairie, Minn. 55345

[21] Appl. No.: 09/139,470

[22] Filed: Aug. 25, 1998

Related U.S. Application Data

[60] Provisional application No. 60/056,418, Aug. 25, 1997.

[51] Int. Cl.$^7$ .............................. B67D 3/00; A01K 5/02; A01K 7/00
[52] U.S. Cl. ......................... 222/479; 222/650; 119/72.5
[58] Field of Search .................... 222/478, 650, 222/479, 420; 119/72, 72.5

[56] References Cited

U.S. PATENT DOCUMENTS

| | | |
|---|---|---|
| 1,293,017 | 2/1919 | Broche . |
| 2,991,911 | 7/1961 | Spain . |
| 3,216,663 | 11/1965 | Frampton et al. . |
| 3,430,823 | 3/1969 | Hunsaker . |
| 3,941,283 | 3/1976 | Garbe ....................................... 222/187 |
| 3,991,939 | 11/1976 | Maclay . |
| 4,042,150 | 8/1977 | Roos . |
| 4,222,497 | 9/1980 | Lloyd et al. ............................... 222/57 |
| 4,249,559 | 2/1981 | George . |
| 4,583,664 | 4/1986 | Bayat ........................................ 222/61 |
| 4,601,707 | 7/1986 | Albisser et al. ......................... 604/131 |
| 4,830,509 | 5/1989 | Gulmatico, Jr. ......................... 222/129 |
| 4,938,240 | 7/1990 | Ruttenberg . |
| 5,238,187 | 8/1993 | Zlotnik et al. . |
| 5,542,605 | 8/1996 | Campau ................................... 222/650 |
| 5,634,342 | 6/1997 | Peeters et al. .............................. 62/3.4 |
| 5,645,192 | 7/1997 | Amidzich ................................. 222/397 |
| 5,655,563 | 8/1997 | Johnson . |

OTHER PUBLICATIONS

Home Automation Systems, Inc., "Water Your Houseplants Automatically", Automatic Houseplant Watering System, Home Automation Systems Catalog, vol. 31, p. 89.

*Primary Examiner*—Gregory L. Huson
*Assistant Examiner*—Keats Quinalty

[57] ABSTRACT

A portable liquid dispensing apparatus for plant care having a microprocessor timer assembly (7) which communicates to a solenoid (1) that when activated moves the spring valve (2) to open position allowing air into the container (4) receiving air pressure inside the container (4) thereby getting gravity fed liquid flow out of liquid outlet (9).

7 Claims, 2 Drawing Sheets

6,092,699

GRAVITY FLOW MICROPROCESSOR CONTROLLED PORTABLE PLANT DISPENSING SYSTEM

This application claims benefit of Provisional Application Ser. No. 60/056,418, filed Aug. 25, 1997.

BACKGROUND

1. Field of Invention

The present invention relates generally to a liquid dispenser, and more particularly to an automatic liquid dispenser useful in a variety of applications in which a consistent volume of liquid needs to be dispensed at periodic time intervals.

2. Description of Prior Art

Dispensing liquids on a periodic basis is a common task around the home, workplace, or laboratory. Typical applications that require liquid to be dispensed in a controlled fashion include plant watering/feeding, fertilizing, air freshening, drain cleaning, toilet bowl cleaning, pet watering, medicating, lubricating, humidifying and fumigating.

Expanding on the plant watering/feeding example, house plants are a popular way to create a pleasant, healthy environment in the home or office. However, if there are many plants, this entails a great deal of time, effort and inconvenience. Too little or too much water can injure or kill a plant. Also, many plants do best when the roots are allowed to dry between waterings. Watering should therefore be done on a regular basis using a correct amount of water at the appropriate interval. Also, if the plant caretaker is absent for any extended period of time, arrangements must be made for watering. It is expensive to pay an interim caretaker, and could possibly cause a security problem as well. Therefore, an automatic watering/feeding system would be desirable.

Although various automatic watering systems are known, none are widely used in home and office. It is common to use systems with small orifices or restrictors which drip water continuously onto the plant. Such systems are typically used in a nursery or garden, where plants are grouped closely together, and water can be supplied from a pressurized source. Since it is necessary to interconnect each plant with a tube or pipe, these systems are impractical or undesirable for the typical home or office where plants are spread out or moved randomly. Further, these types of systems are relatively expensive. Pressurized systems and some gravity feed systems from an elevated reservoir are sometimes used but this also includes interconnected tubing and is therefore impractical for most watering requirements in the home or office.

Other methods used to water individual plants, sometimes used by vacationers, may include moving the plants to a sink, for example, and setting them in a shallow level of water, thus soaking the roots continuously for the entire period of absence. This method is impractical where the plants are too numerous or too big to move. It also is harmful to those plants which require roots to dry out between waterings. Too much water can lead to mold, for example, which can kill the plant. Yet another method used includes setting a container of water next to or above the plant and extending a wetted wick from the container to the plant. Capillary action draws water gradually and continually from the container to the plant. This method has several drawbacks. While the flow is continual, the rate of flow varies with the level of water in the container. As the level drops, the flow rate slows. Also, since the flow is continual, there is the possibility of damage to the plant due to over-soaking of the roots.

OBJECTS AND ADVANTAGES

A primary object of the present invention is to provide an automatic liquid dispenser apparatus which dispenses a consistent volume of liquid at certain discrete time intervals from a liquid storage container. The timing between periodic time intervals is controllable independent of the container level. The function of this device is to give the user abilities to preset an event that happens periodically as time passes that controls both how often (frequency) and how much (amount) of liquid is intermittently dispensed.

This goal is accomplished by the use of electronically controlled 1) microprocessor timer assembly that allows for intermittent dispensing of a controlled volume of liquid. 2) A valve system utilizing air pressure sensitive to open and close stages that releases fluids with gravity force inertia.

Accordingly, one object of the present invention is to provide an improved liquid dispenser in which defined events would take place as per the programmable controller.

Another object of the present invention is to provide an automatic liquid dispenser which a consistent amount of fluid is dispensed at each interval as per the programmable controller timer assembly.

Yet another object of the present invention is provide a compact, economic design which is versatile in use and which can be manufactured in range of sizes and capacities.

Still another object of the present invention is provide an economical design which includes a unique display of banner advertisement attached to the outside of the portable container manufactured precisely to fit the aesthetics and commercial requirements of the owner of the automatic liquid dispenser.

Another object of the present invention is to provide an improved automatic liquid dispenser which can accurately dispense a measured amount of liquid at a rate which is independent of ambient temperature variations.

A still further object of the present invention is to provide an improved liquid dispenser which can be used with liquids having a low viscosity and undergoing a low rate of flow.

Yet another object of the present invention is to allow both venting and fluid outlet to be located on top or side of the container so that siphoning action would still function.

SUMMARY

In accordance with the present invention, an improved automatic dispenser is provided that preserves the beneficial features and advantages of known devices while at the same time overcoming disadvantages and achieving additional advantages, such as enhanced capabilities, a wider range of use, and a simple economic construction.

DESCRIPTION

In the preferred embodiment of the present invention, and improved programmable automatic liquid dispenser is provided for dispensing a programmed consistent volume of liquid. The liquid dispenser includes a container adapted to hold a dispensable liquid, a microprocessor timer assembly in fluid communication with a valve release spring attached to the cap screwed onto the top of the container. The microprocessor timer assembly in conjunction with the valve assembly permits the liquid to gravity flow out of the container for a programmable amount of time which is independent of the quantity of liquid within the container. The microprocessor timer assembly allows for definable periodic release of gravity fed liquid as well as definable amounts of liquid dispensed.

The liquid dispensing apparatus of the present invention permits an increase or decrease in frequency of events, time between events, as well as how much liquid will gravity flow out, based on desired requirements. Additionally, this adjustable functionality will allow these events to be changed at any time the events' requirements need to be adjusted. Alternatively, the microprocessor timer assembly can allow a consistent amount of liquid to gravity flow out of the container as the container liquid level drops, independent of air temperature variations inside or outside the container.

The microprocessor timer assembly includes a solenoid, linear or rotor actuator, (such as shown in drawing FIG. 2) for allowing air pressure reduction by releasing the spring assembly to allow liquid to flow out of the container. The microprocessor timer assembly also includes mechanical spring assembly (such as shown in the drawing FIG. 2). The container has an opening at the bottom of the container for dispensing liquid (such as shown in drawings FIGS. 1 and 2). The container also has a conduit to dispense the liquid to a desired location.

OPERATION

A method for automatically dispensing a consistent amount of liquid also forms part of the present invention. The method of the present invention includes the steps of providing a container adapted to hold a dispensable liquid; setting the microprocessor timer assembly for a time based actuation force to the spring assembly permitting liquid to flow out of the container for a desired amount of time which determines the amount of liquid dispensed.

The method of the present invention permits the controlled rate of liquid gravity flowing out of the container to remain at consistent time based periods, into the plant container, remaining relatively constant as the container liquid level drops, independent of the temperature variations within the container.

BRIEF DESCRIPTION OF THE DRAWINGS

These and other features, objects, and advantages of the present invention will become apparent from the following description of the drawings wherein like reference numerals represent like elements in the several views, and in which.

DETAILED DESCRIPTION OF THE PREFERRED EMBODIMENT

Figure 1:
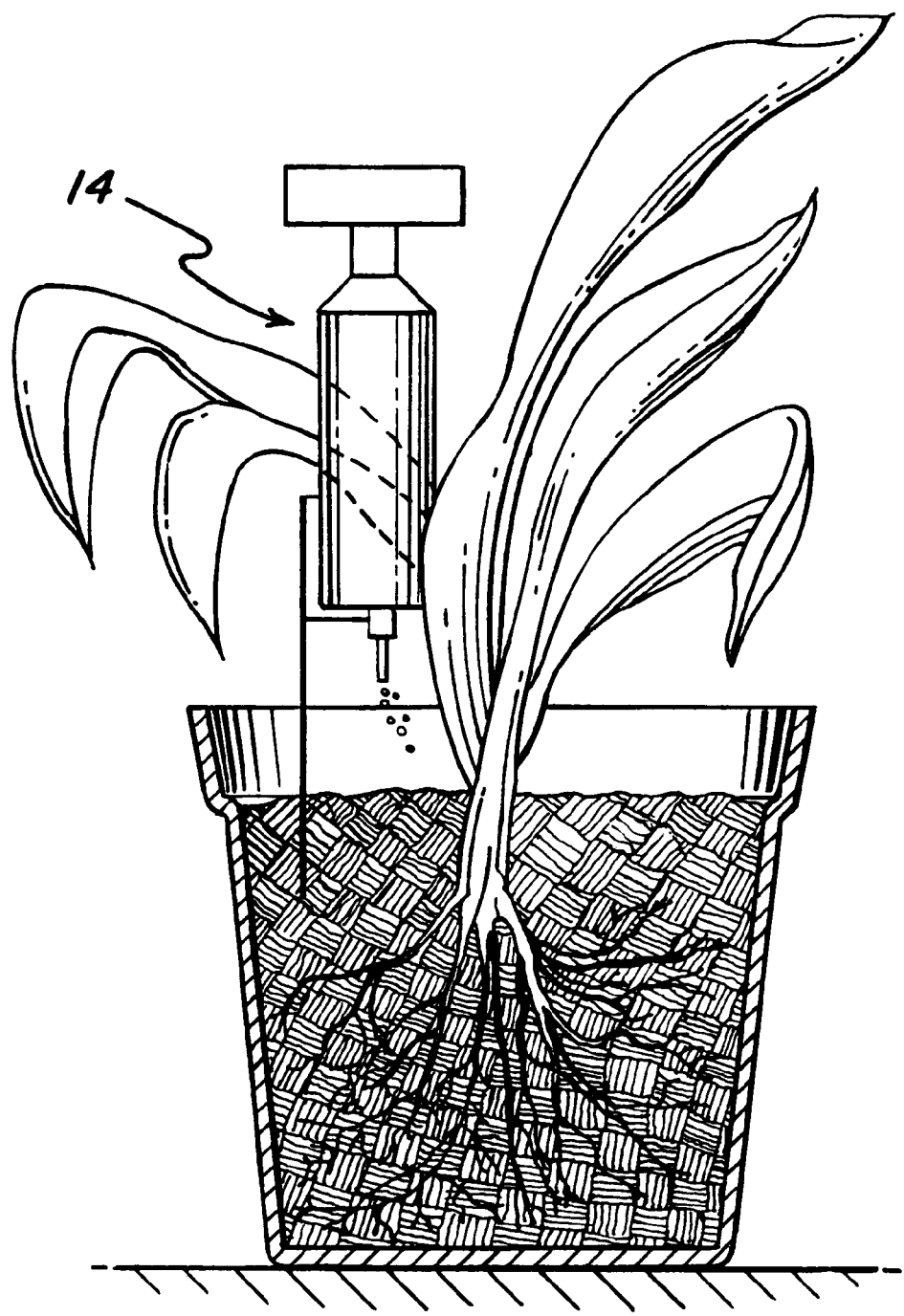
FIG. 1 is a side perspective view of the present invention 14 shown mounted within the soil of a potted plant.
Figure 2:
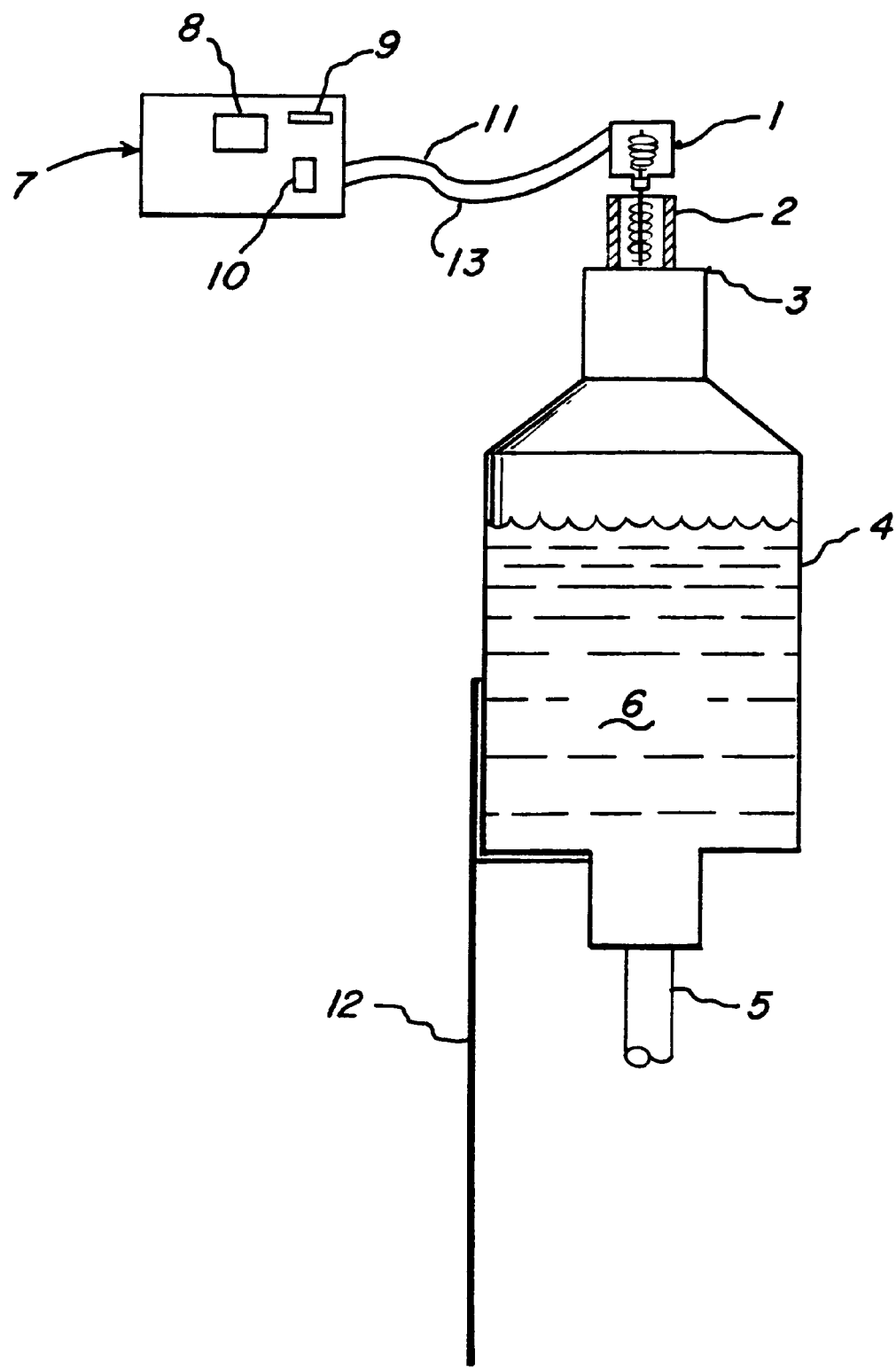
FIG. 2 is an exploded partial cross-sectional view of the liquid dispenser of the present invention, showing the various components prior to assembly.

One preferred embodiment of the gravity fed liquid dispenser apparatus of the present invention, a plant waterer is shown as 14 in FIG. 1. Referring to FIG. 2 liquid dispenser 14 includes a liquid storage container generally designated 4 which houses the liquid 6. Container 4 includes a tight fitting cap 3 to maintain air pressure resistance holding water 6 within the container. The cap 3 can be removed to refill container 4. The liquid outlet 5 is sized such that air pressure will not allow fluid to flow from the container except when vented by the venting assembly 2. The liquid level is shown in container 4 as 6 will remain constant except when vented. The system works in a similar fashion to a pipette. Air pressure retains the liquid in the container. The electronic solenoid 1 is actuated by an electronic microprocessor timer generally described as circuit assembly 7. This circuit assembly 7 is comprised of a power supply 9, microprocessor 8, LED 10, and wires 11 and 13 to connect to solenoid 1. Actuating the solenoid allows air into the container, thereby releasing liquid out of the liquid outlet 5. As mentioned previous the solenoid function could be implemented by any device capable of moving the venting valve 2 to a position which allows air to flow freely out of the container. The timer control circuit 7 allows for user programmability of liquid dispensing events and also provides user visual feedback to provide system status and dispensing timing information.

SUMMARY, RAMIFICATIONS, AND SCOPE

Accordingly, the gravity fed microprocessor plant care apparatus is a portable assembly that can be programmed by the owner for a variety of different conditions. In addition to programmability the owner will see visual feedback to the results of the desired programmed events for both frequency (how often between intervals) and how long (amount) the liquid will gravity flow into the plant. This permits a high degree of flexibility in using this device for small to medium plants as well as large plants in homes, offices, and commercial buildings.

The device is portable whereby it can be moved whenever required, refillable container and the container size can be varied to be aesthetically pleasing to the eye. Furthermore the device has additional advantages in that:

it permits unattended plant feeding for long periods of time, it allows for top or bottom feeding by utilizing the water flow to a particular location in plant holder, it solves the need to be connected to a pressurized water source, and it provides a consistent set of events for plant watering while being left unattended after filling the container with liquid.

Although the description above contains many specifics, these should not be construed as limiting the scope of the invention, but merely as providing illustrations of some of the presently preferred embodiments of this invention. For example the container shape, size, and graphical illustrations could be varied and used as a miniature 'billboard' home advertisement that could lead to many commercializing aspects of the device which would be more design oriented.

Thus the scope of the invention should be determined by the appended claims and their legal equivalents, rather than by the examples given.

What is claimed is:

1. A portable gravity flow microprocessor controlled dispensing apparatus for intermittent dispensing of fluids for a controlled period of time comprising:

a container for retaining fluids for dispensing;

a timing device which is programmable for an event that can be adjusted for both length of time between actuating and length of time to stay on;

a venting spring assembly valve to allow air vacuum pressure in the container to be released allowing the liquid to gravity feed out of the container; and a circuit assembly that manages the solenoid on/off function.

2. A portable gravity flow liquid dispensing apparatus for the intermittent dispensing of liquids comprising:
   a) a container for retaining and dispensing liquid, said container having a top with a top opening for receiving a preselected liquid and ambient air and a liquid dispensing outlet positioned below said top opening,
   b) a timing device programmable to control sequential events; and
   c) a closure for closing off said top opening, said closure including a valve connected to and controlled by said timing device and adapted, when controlled, to admit ambient air into said container to thereby facilitate a proportional discharge of liquid from said container through said liquid dispensing outlet.

3. The apparatus of claim 2, further characterized by said timing device being programmable to control the frequency of said sequential events.

4. The apparatus of claim 3, wherein said timing device is programmable to control the time duration of said sequential events.

5. The apparatus of claimed 2, wherein said timing device is programmable to control the time duration of said sequential events.

6. The apparatus of claim 2, further characterized by including a support connected to said container for facilitating the vertical positioning of said container.

7. The apparatus of claims 2, wherein said timing device is positioned on said top of said container.

\* \* \* \* \*